No. 766,031. PATENTED JULY 26, 1904.
S. FULLER.
WHEEL WEEDER.
APPLICATION FILED APR. 15, 1903. RENEWED JAN. 4, 1904.
NO MODEL. 2 SHEETS—SHEET 1.
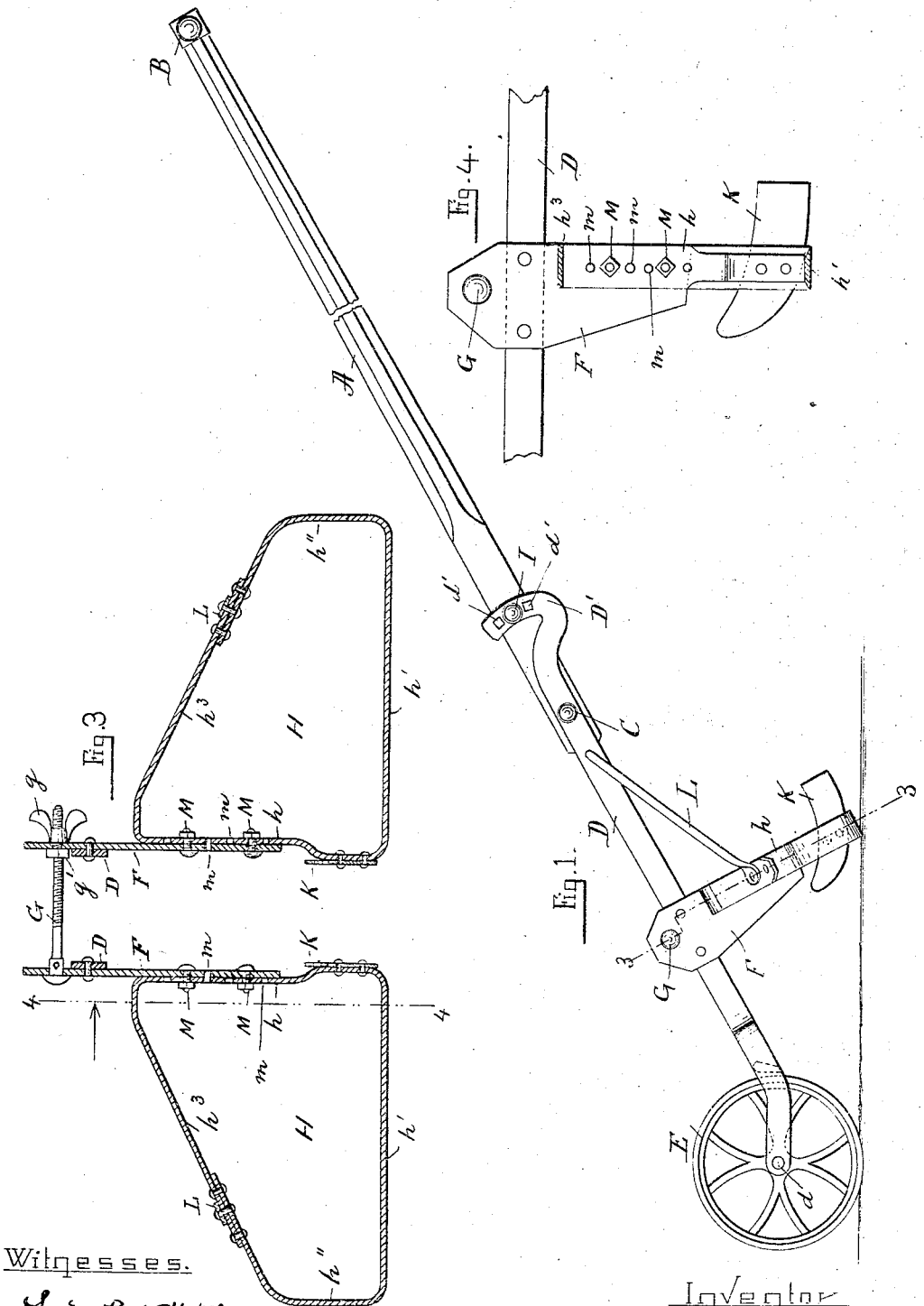
Witnesses.
Lauritz N. Möller
Mary C. Möller
Inventor
Solomon Fuller.
by Alban Andrew his atty.

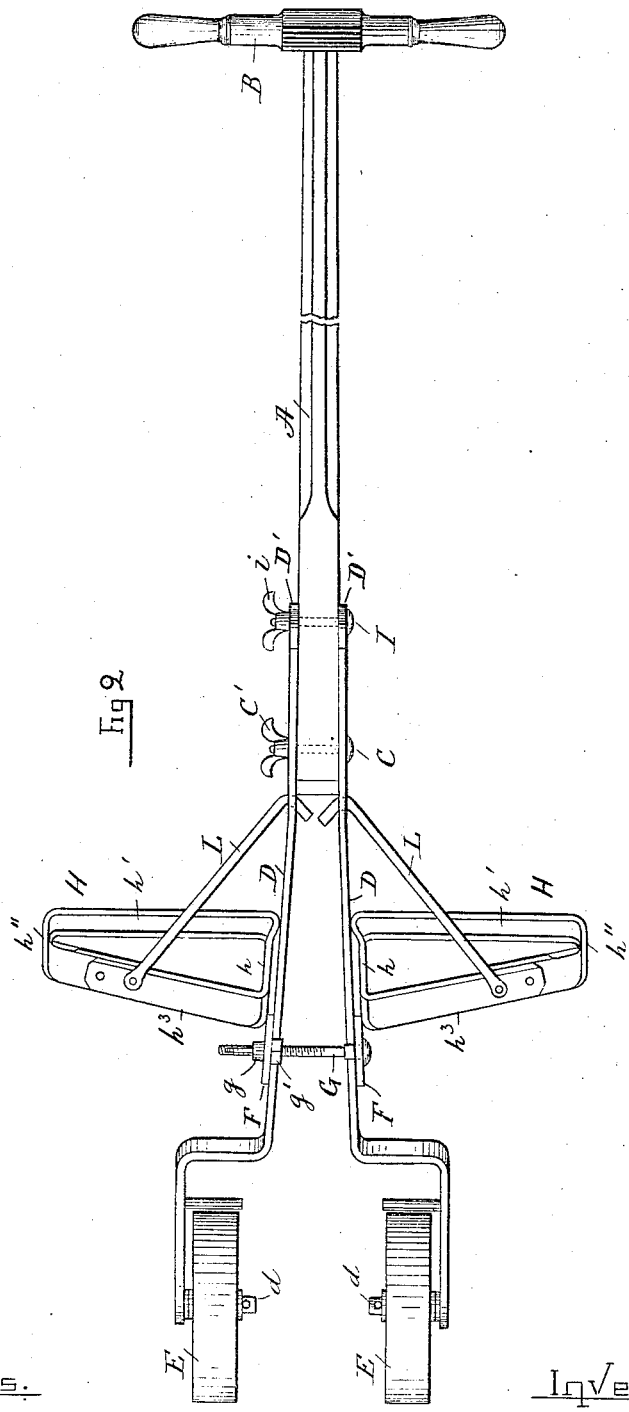

No. 766,031. Patented July 26, 1904.

UNITED STATES PATENT OFFICE.

SOLOMON FULLER, OF DANVERS, MASSACHUSETTS.

WHEEL-WEEDER.

SPECIFICATION forming part of Letters Patent No. 766,031, dated July 26, 1904.

Application filed April 15, 1903. Renewed January 4, 1904. Serial No. 187,736. (No model.)

*To all whom it may concern:*

Be it known that I, SOLOMON FULLER, a citizen of the United States, and a resident of Danvers, in the county of Essex and State of Massachusetts, have invented certain new and useful Improvements in Wheel-Weeders, of which the following is a specification.

This invention relates to improvements in wheel-weeders for weeding beets, parsnips, and other vegetables usually planted in rows, and it is constructed as follows, reference being had to the accompanying drawings, wherein—

Figure 1 is a side elevation of the invention. Fig. 2 is a top plan view of Fig. 1. Fig. 3 is an enlarged cross-section on the line 3 3 shown in Fig. 1, and Fig. 4 is a vertical section on the line 4 4 shown in Fig. 3.

Similar letters refer to similar parts wherever they occur on the different parts of the drawings.

In the drawings, Figs. 1 and 2, A is the handle-bar, provided at its upper end with a handle B, as is usual in devices of this kind. To opposite sides of the lower portion of the bar A are pivotally connected, preferably by means of a screw-bolt C and nut C', a pair of laterally-adjustable yielding metal frames D D, to the lower forward ends of which are journaled upon pins or axles $d$ $d$ the wheels E E. (Shown in Figs. 1 and 2.) The wheels E E are shown as being arranged on the insides of the lower ends of the frames D D; but I wish to state that I do not desire to limit myself to this exact construction, as, if so desired, said wheels may be arranged on the outside of said frames without departing from the essence of my invention.

To each frame D is firmly secured a metal plate or bracket F, as shown in the drawings. Said brackets are adjustably connected together by means of a screw-bolt G, one end of which is secured to one of the brackets, the other end passing loosely through a perforation in the opposite bracket and provided at its outer end with a thumb-nut or adjusting-nut $g$ and a set-nut $g'$, as shown, by means of which the free ends of the frames D D and their respective weeder-blades may readily be adjusted to and from each other and secured in such adjusted positions. To the outside of each bracket F is adjustably secured the skeleton weeder-blades H H, each composed of a continuous annular metal strip $h$ $h'$ $h''$ $h^3$, as shown in the drawings. The part $h$ of such weeder is the upright portion, which is adapted to be adjustably secured to the bracket F by means of screw-bolts and nuts M M and perforations $m$ $m$ in said weeder part $h$ and bracket F, as shown. The horizontal portion $h'$ of each weeder-blade is made with a cutting edge, as shown in Fig. 4, for the purpose of cutting the weeds and opening the soil on opposite sides of the row of plants, as is common in devices of this kind.

Each of the metal frames D is provided at its upper end with a curved extension D', having perforations $d'$ $d'$, through which and a similar perforation in the bar A a fastening-bolt I, provided with a thumb-nut $i$, is inserted and by means of which said metal frames are secured in the desired adjusted positions on the bar A.

By adjusting the position of the weeder-blades relative to the brackets F F, as well as by adjusting the position of the bar A relative to the frame extensions D' D', the inclination of the bar A may be adjusted, so as to enable it to be held in the most convenient position and inclination relative to the size and height of the person using the weeder.

The outer portion $h''$ and the inclined upper portion $h^3$ of the skeleton weeder act as a brace for stiffening it, by which I am enabled to use lighter steel as compared with weeders in which such brace is omitted. To the inside of the lower upright portion $g$ of each skeleton weeder is secured a guard or shield K, which serves the purpose of preventing the loose earth and weeds loosened by the weeders from being thrown over and around tender growing plants during the weeding operation.

For the purpose of relieving the strain on the weeder-blades when in use I prefer to secure their upper portions by means of stays or braces L L to the adjustable metal frames D D, as shown in Figs. 1, 2, and 3. The rear ends of such braces L L are preferably hooked and pivotally connected to said metal frames, as shown.

In using the device the operator takes hold of the handle B and pushes the wheel-weeder forward in such a manner as to cause the cutters $h'$ $h'$ to be guided on opposite sides of the row of the plants, and by depressing said handle more or less the cutter-blades $h'$ $h'$ are caused to enter the soil more or less, as may be desired, thus cutting and uprooting the weeds on either side of the row of plants and at the same time turning over and disintegrating the soil at the sides of the row of the vegetables without injuring either the stalks, roots, or foliage of such plants.

What I wish to secure by Letters Patent and claim is—

1. A wheel-weeder, consisting of a handle-bar and laterally-adjustable yielding metal frames, pivotally connected to said handle-bar, and having means for adjusting the latter to said frames in combination with wheels or rollers E, E, brackets F, F, and skeleton weeders H, H, adjustably secured to said brackets, and means for laterally adjusting the said frames, and weeder-blades, substantially as and for the purpose set forth.

2. A wheel-weeder, consisting in combination, a handle-bar, laterally-adjustable weeder-frames, pivotally connected to said handle-bar, brackets F, F, on said frames, skeleton weeders H, H, adjustably secured to said brackets and shields or guards K, K, secured to the interior portions of said weeders, substantially as and for the purpose set forth.

3. A wheel-weeder, consisting in combination, a handle-bar, laterally expansive and adjustable weeder-frames pivotally connected to said handle-bar, skeleton weeder-blades adjustable relative to said frames and stays or braces L, L, secured to said weeder-blades and pivoted in their rear ends to the weeder-frames as and for the purpose set forth.

In testimony whereof I have affixed my signature in presence of two witnesses.

SOLOMON FULLER.

Witnesses:
ALBAN ANDRÉN,
HELEN P. ANDRÉN.